(12) United States Patent
Lee et al.

(10) Patent No.: US 10,356,754 B2
(45) Date of Patent: Jul. 16, 2019

(54) METHOD FOR SUPPORTING SPORADIC HIGH-CAPACITY PACKET SERVICE AND APPARATUS THEREFOR

(71) Applicant: LG ELECTRONICS INC., Seoul (KR)

(72) Inventors: Hojae Lee, Seoul (KR); Hyunsoo Ko, Seoul (KR); Kukheon Choi, Seoul (KR); Kwangseok Noh, Seoul (KR); Dongkyu Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 15/555,010

(22) PCT Filed: Apr. 25, 2016

(86) PCT No.: PCT/KR2016/004288
§ 371 (c)(1),
(2) Date: Aug. 31, 2017

(87) PCT Pub. No.: WO2016/182228
PCT Pub. Date: Nov. 17, 2016

(65) Prior Publication Data
US 2018/0041988 A1 Feb. 8, 2018

Related U.S. Application Data

(60) Provisional application No. 62/159,282, filed on May 10, 2015.

(51) Int. Cl.
*H04L 1/00* (2006.01)
*H04L 1/18* (2006.01)
(Continued)

(52) U.S. Cl.
CPC .......... *H04W 72/02* (2013.01); *H04L 1/0001* (2013.01); *H04L 1/1854* (2013.01);
(Continued)

(58) Field of Classification Search
CPC ............... H04W 72/02; H04W 56/001; H04W 72/0446; H04W 56/00; H04W 72/042;
(Continued)

(56) References Cited

U.S. PATENT DOCUMENTS 9,698,898 B2 * 7/2017 Doetsch ............... H04L 5/0007
9,736,874 B2 * 8/2017 Sartori ............. H04W 56/0015
(Continued)

FOREIGN PATENT DOCUMENTS

WO      2012023819      2/2012

OTHER PUBLICATIONS

PCT International Application No. PCT/KR2016/004288, Written Opinion of the International Searching Authority dated Aug. 3, 2016, 15 pages.
(Continued)

*Primary Examiner* — Sharad Rampuria
(74) *Attorney, Agent, or Firm* — Lee Hong Degerman Kang & Waimey (57) ABSTRACT

A method for supporting a sporadic high-capacity packet service by a terminal may comprise the steps of: receiving, from a base station, control information including pre-defined timing information for synchronization and resource allocation information associated with the terminal; when uplink traffic occurs, performing transmission synchronization on the basis of the pre-defined timing information for synchronization; selecting a resource for uplink data transmission on the basis of the resource allocation information; and transmitting uplink data through the selected resource.

12 Claims, 8 Drawing Sheets

(51) Int. Cl.
*H04L 5/00* (2006.01)
*H04W 4/70* (2018.01)
*H04J 11/00* (2006.01)
*H04W 56/00* (2009.01)
*H04W 72/02* (2009.01)
*H04W 72/04* (2009.01)

(52) U.S. Cl.
CPC .......... *H04L 5/0014* (2013.01); *H04L 5/0051* (2013.01); *H04L 5/0069* (2013.01); *H04L 5/0091* (2013.01); *H04W 56/00* (2013.01); *H04W 56/001* (2013.01); *H04W 72/0446* (2013.01); *H04J 11/0036* (2013.01); *H04L 5/008* (2013.01); *H04L 5/0048* (2013.01); *H04L 5/0055* (2013.01); *H04W 4/70* (2018.02); *H04W 72/042* (2013.01); *H04W 72/0413* (2013.01)

(58) Field of Classification Search
CPC .. H04W 72/0413; H04W 4/70; H04L 1/1854; H04L 1/0001; H04L 5/00; H04L 5/0055; H04L 5/0051
See application file for complete search history.

(56) References Cited

U.S. PATENT DOCUMENTS

| | | |
|---|---|---|
| 2009/0109912 A1 | 4/2009 | DiGirolamo et al. |
| 2009/0196208 A1* | 8/2009 | Yu ............... H04W 52/0216 370/311 |
| 2011/0292936 A1 | 12/2011 | Wang et al. |
| 2013/0114570 A1* | 5/2013 | Park ............... H04L 5/0053 370/335 |
| 2014/0254544 A1 | 9/2014 | Kar Kin Au et al. |

OTHER PUBLICATIONS

NEC, "Performance of Uplink frequency hopping for LTE Rel-13 MTC", 3GPP TSG RAN WG1 Meeting #80, R1-150288, Feb. 2015, 4 pages.

ETRI, "Link performance of uplink data transmission for MTC", 3GPP TSG RAN WG1 Meeting #80, R1-150517, Feb. 2015, 3 pages.

European Patent Office Application Serial No. 16792874.6, Search Report dated Nov. 15, 2018, 10 pages.

Au, K. et al., "Uplink Contention Based SCMA for 5G Radio Access", IEEE Conference Proceedings, Nov. 2013, XP055408025, 6 pages.

Popovski, P. et al., "Deliverable D2.3 Components of a new air interface—building blocks and performance", Retrieved from the web, Apr. 2014, XP055248878, 118 pages.

* cited by examiner

METHOD FOR SUPPORTING SPORADIC HIGH-CAPACITY PACKET SERVICE AND APPARATUS THEREFOR

CROSS-REFERENCE TO RELATED APPLICATIONS

This application is the National Stage filing under 35 U.S.C. 371 of International Application No. PCT/KR2016/004288, filed on Apr. 25, 2016, which claims the benefit of U.S. Provisional Application No. 62/159,282, filed on May 10, 2015, the contents of which are all hereby incorporated by reference herein in its entirety.

TECHNICAL FIELD

The present invention relates to wireless communication, and more particularly, to a method of supporting a massive sporadic packet service and an apparatus therefor.

BACKGROUND ART

In a next-generation 5G system, massive machine type communications (MTC) for maintaining massive connection and sporadically transmitting a short packet have been considered. The massive MTC service has very high connection density requirement, whereas data rate and end-to-end (E2E) latency requirement is very free (Connection Density: Up to 200,000/km2, E2E Latency: Seconds to hours, DL/UL Data Rate: typically 1-100 kbps).

Currently, with regard to cellular Internet of things (IoT) that has been discussed in 3GPP GRAN, technologies in a model in which about 50000 or more user equipments (UEs) are present in one cell have been developed.

However, a detailed method of effectively supporting a massive sporadic packet based on multi-user access has not been proposed thus far.

DISCLOSURE

Technical Problem

An object of the present invention devised to solve the problem lies in a method of supporting a massive sporadic packet service by a user equipment (UE).

An object of the present invention devised to solve the problem lies in a UE for supporting a massive sporadic packet service.

It is to be understood that both the foregoing general description and the following detailed description of the present invention are exemplary and explanatory and are intended to provide further explanation of the invention as claimed.

Technical Solution

The object of the present invention can be achieved by providing a method of supporting a massive sporadic packet service by a user equipment (UE), the method including receiving control information including predefined timing information for synchronization and resource allocation information related to the UE from a base station (BS), performing transmission synchronization based on the predefined timing information for synchronizing when uplink traffic occurs, selecting a resource for uplink data transmission based on the resource allocation information, and transmitting uplink data through the selected resource. The control information may further include pilot sequence information specified for the UE and a pilot signal with the pilot sequence applied thereto may be transmitted in the selected resource to be superposed with the uplink data.

In the method, the control information may further include hopping pattern information and the method may further include receiving a NACK signal with respect to the uplink data transmission from the BS and selecting a resource for retransmission of the uplink data according to the NACK signal by performing resource hopping based on the resource hopping pattern information.

The uplink data may be transmitted in a connectionless state with the BS. The predefined timing information for synchronization may include periodic timings. The uplink data is transmitted at a timing closest to periodic timings included in the predefined timing information for synchronization from when the uplink traffic occurs.

In another aspect of the present invention, provided herein is a user equipment (UE) for supporting a massive sporadic packet service, the UE including a receiver configured to receive control information including predefined timing information for synchronization and resource allocation information related to the UE from a base station (BS), a processor configured to perform transmission synchronization based on the predefined timing information for synchronizing when uplink traffic occurs and to select a resource for uplink data transmission based on the resource allocation information, and a transmitter configured to transmit uplink data through the selected resource.

The control information may further include pilot sequence information specified for the UE, and the processor may control the transmitter to transmit a pilot signal with the pilot sequence applied thereto in the selected resource to be superposed with the uplink data.

The control information may further include hopping pattern information, the receiver may be configured to receive a NACK signal with respect to the uplink data transmission from the BS, and the processor may be configured to select a resource for retransmission of the uplink data according to the NACK signal by performing resource hopping based on the resource hopping pattern information.

The uplink data may be transmitted in a connectionless state with the BS. The predefined timing information for synchronization may include periodic timings. The uplink data is transmitted at a timing closest to periodic timings included in the predefined timing information for synchronization from when the uplink traffic occurs.

Advantageous Effects

According to an embodiment of the present invention, a multiple access method appropriate for a massive machine type communications (MTC) packet service environment may be effectively supported.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 1:
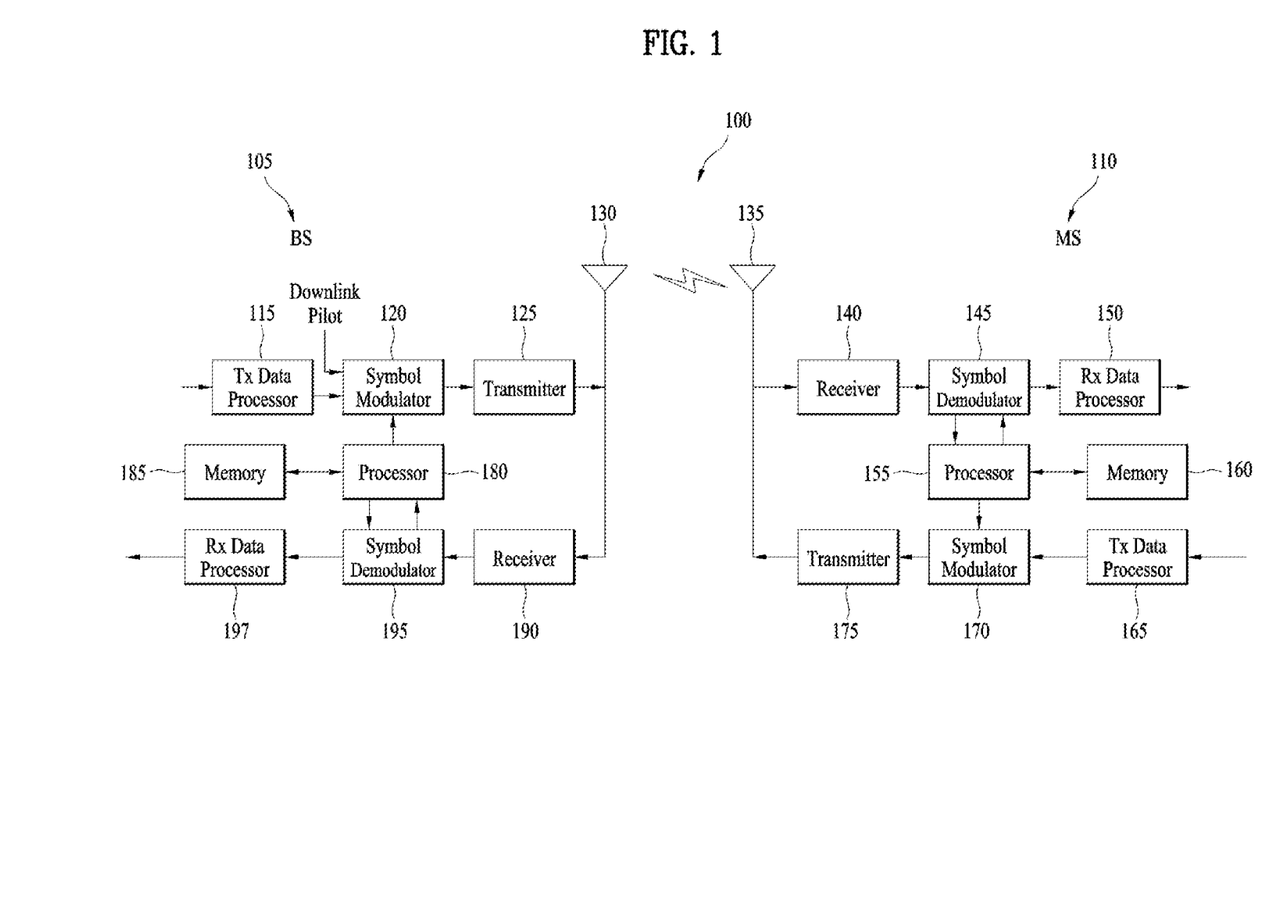
FIG. 1 is a block diagram for configurations of a base station 105 and a user equipment 110 in a wireless communication system 100.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Figure 2:
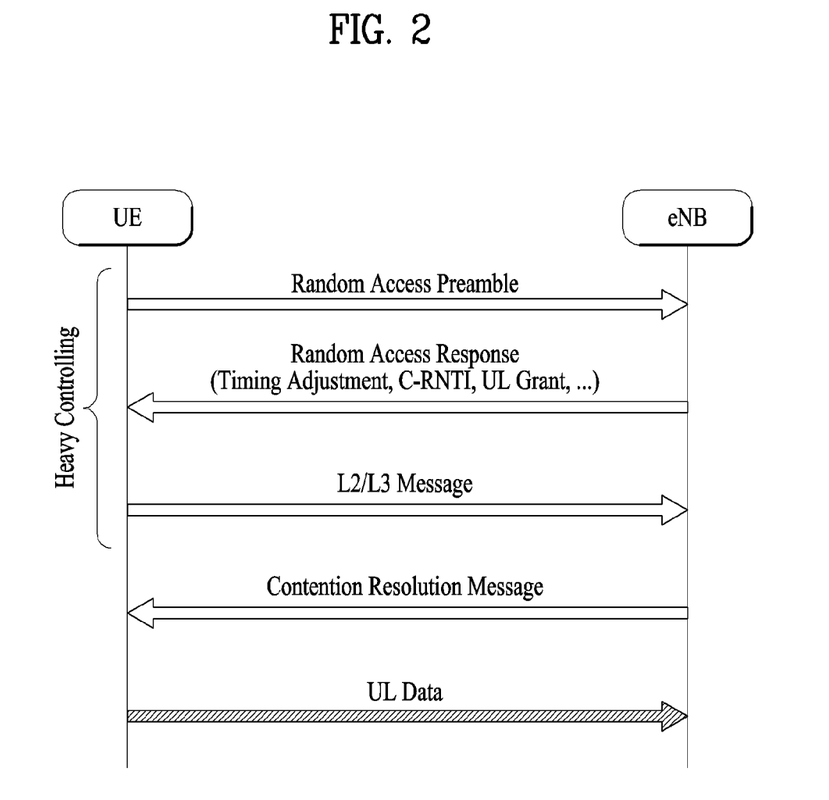
FIG. 2 is a diagram illustrating an example of a contention-based random access procedure in a 3GPP LTE/LTE-A system.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention proposes a scheme for multiple access (MA) appropriate for a massive machine type communications (MTC) packet service environment.

FIG. 2 is a diagram illustrating an example of a contention-based random access procedure in a 3GPP LTE/LTE-A system.

FIG. 2 illustrates an uplink access method in a long-term evolution (LTE) communication system. The access method may also be used in an ad-hoc network such as device to device (D2D) or vehicular to everything (V2X) and a cellular based method such as LTE-advanced (LTE-A) and machine type communication (MTC).

The contention-based multiple access method may be initiated by transmitting scheduling request (SR) to a BS from a UE and receiving scheduling information from the BS. In FIG. 2, the UE may transmit random access preamble to the BS and receive a random access response message from the BS to initiate the contention-based multiple access method. The scheduling information received by the UE from the BS may be transmitted by containing control information including timing adjustment (or timing advance (TA)) and cell identifier (ID) information for synchronization between received signal from multi-users, and grant (e.g., MCS level information or resource allocation (RA)) information for uplink access in a physical downlink control channel (PDCCH).

In general, a communication system is a communication system in which a plurality of UEs use a limited wireless resource, whereas one UE is not capable of knowing a state of another UE and, thus, a plurality of UEs may simultaneously make a request for resource allocation with respect to the same resource in some cases. Accordingly, a BS may resolve contention requested by a plurality of UEs and transmit the information (contention resolution message in FIG. 2). In addition, a BS may transmit control information for network access and HARQ to a UE (L2/L3 message in FIG. 2) and a UE may transmit uplink data (UL data in FIG. 2).

In a next-generation 5G system, a wireless sensor network (WSN), massive machine type communications (MTC), and so on for sporadically transmitting a short packet using massive connection/low cost/low power service as a target have been considered. The massive MTC service has very strict connection density requirement, whereas data rate and end-to-end (E2E) latency requirement is very free (e.g., Connection Density: Up to 200,000/km2, E2E Latency: Seconds to hours, DL/UL Data Rate: typically 1-100 kbps).

In general, connection density may be determined based on the number of supportable UEs. A conventional contention-based multiple access method identifies a physical random access channel (PRACH) for transmitting a random access preamble of a UE by a BS to control contention of multiple access like in FIG. 2 and, thus, it may be difficult to satisfy requirements in massive MTC. In addition, the massive MTC has characteristics of mainly transmitting a sporadic packet that is insensitive to delay and has a small data amount. However, the conventional contention-based multiple access method has a large amount of control information to be exchanged compared with the amount of a transfer packet.

Figure 3:
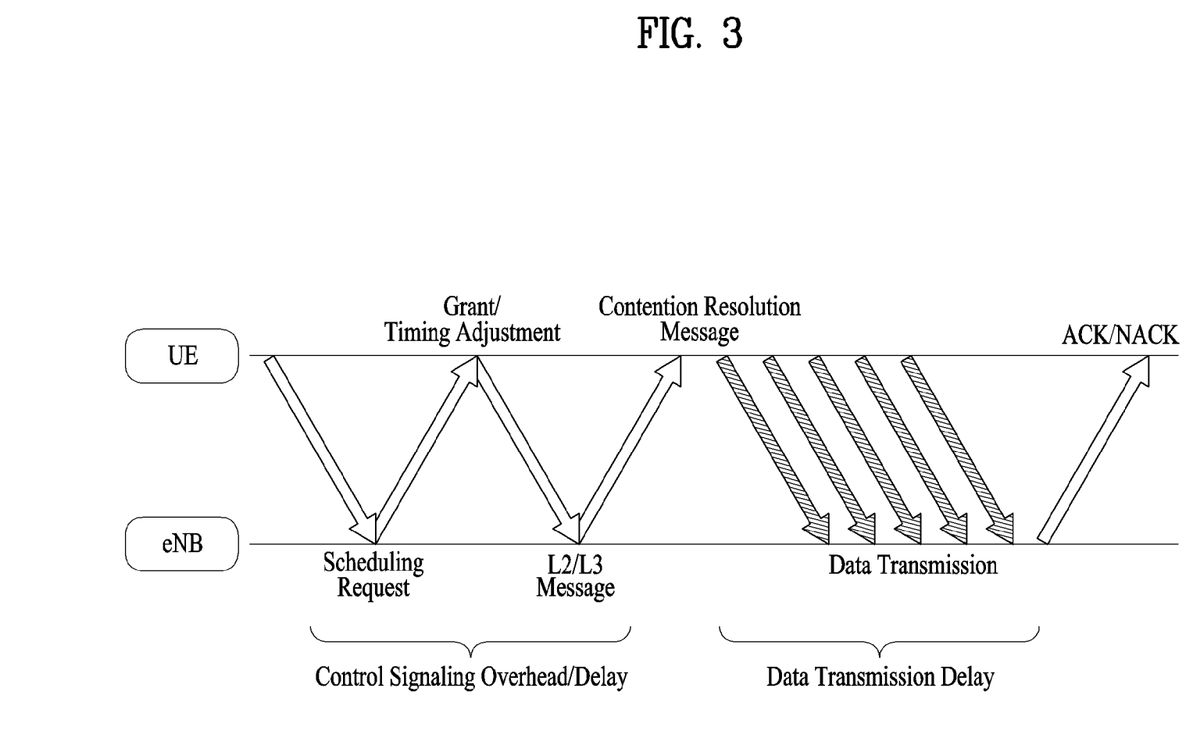
FIG. 3 is a diagram illustrating an example of an uplink procedure of an LTE system.

FIG. 3 is a diagram illustrating an example of an uplink procedure of an LTE system.

In detail, FIG. 3 is a diagram illustrating control signaling overhead and data transmission in an uplink processing procedure. As shown in FIG. 3, a UE may first transmit SR, receive grant/timing adjustment from a BS, transmit an L2/L3 message, receive a contention resolution message and, then, transmit uplink data. As such, in a conventional LTE system, a large amount of control signaling overhead may be generated in order to transmit uplink data by a UE. Accordingly, there is a need for a multiple access method of simplifying a control procedure for transmitting and receiving a massive connection/low cost/low power sporadic packet and controlling multiple access.

The present invention proposes a new multiple access method and resource allocation method of supporting a plurality of multiple accesses for a simplified control procedure and reduction in overhead, for a massive MTC packet service of a next-generation 5G system.

Embodiment 1: Advanced Multiple Access for Massive Sporadic Packet Transmission

For massive sporadic packet transmission, if each UE transmits data in a state in which resource occupation of another user (or UE) is not considered while not be scheduled by a BS, there may be an issue in which data reception of a plurality of UEs is not synchronized and an issue of data collision between multiple UEs in BS side. Accordingly, there is a need for a multiple access method for synchronization and collision control without control information between multiple UEs by a BS.

The present invention proposes a scheme for resolving collision and asynchronization between multiple UEs due to reduction of control signaling for supporting massive sporadic packet transmission.

Figure 4:
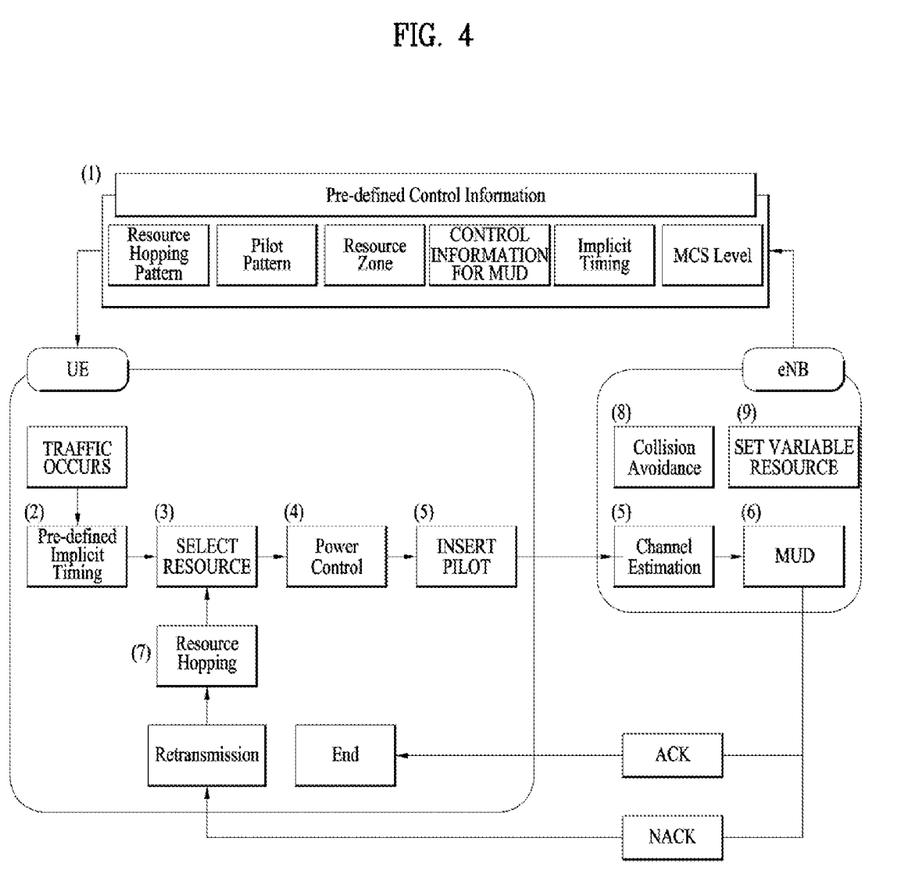
FIG. 4 is a diagram illustrating an example of transceiving procedure for supporting massive sporadic packet transmission.

FIG. 4 is a diagram illustrating an example of transceiving procedure for supporting massive sporadic packet transmission.

As shown in FIG. 4, for supporting massive sporadic packet transmission, uplink data transmission and reception need to be performed without initial control signaling when uplink traffic of a UE occurs and, to this end, the following detailed technologies may be configured.

(1) Each UE may receive control information for uplink data transmission through a predefined control information from a serving BS. Here, the predefined control information may be long-term control information that is pre-shared by a transmitting side (e.g., a UE) and a receiving side (e.g., a BS), may be related to an uplink information transmitting time point, and may be shared between the UE and the BS before uplink traffic occurs. Referring to FIG. 4, the predefined control information may include resource hopping pattern information (in particular, the resource hopping pattern information may be used to select a resource for retransmission) for supporting massive sporadic packet transmission, pilot pattern information, resource zone allocation information, control information for a multi-user detection (MUD), implicit timing information, MCS level information, and so on. Hereinafter, various information items included in the predefined control information will be described in more detail.

(2) A UE may perform synchronization in terms of transmission based on implicit timing information included in the predefined control information. A BS may group UEs with similar propagation delay time for synchronization in terms of reception, allocate the same resource zone to the UEs that are grouped together, and control timing offset in terms of reception within a cyclic prefix (CP) length.

(3) Each UE may select a UE-specific resource and transmit uplink data through the selected resource without consideration of uplink data transmission timing or resource occupation of another UE. Then, a BS that receives uplink data may perform MUD in a symbol level.

(4) Power control for uplink data transmission of a UE may be determined by a UE itself based on channel quality information (CQI) in terms of a long term.

(5) A UE may transmit pilot information (or a reference signal (RS)) for uplink channel estimation in a different RE from a data transmission resource element (RE) or may transmit the pilot information to be superposed with uplink data in the same RE. To this end, a BS may allocate a UE-specific pilot (or a UE-specific RS) sequence to each UE and identify each UE through a successive interference cancelation (SIC) or parallel interference cancelation (PIC) method as an iterative decoding method.

(6) When a plurality of UEs are used to transmit uplink data in one time-frequency resource, a multiple access scheme for supporting multi-user detection (MUD) for identifying and processing of uplink data of each UE by a BS may be used.

(7) During retransmission of uplink data of a UE in response to failure in uplink data decoding of the UE due to the issue in terms of collision between multiple UEs or deterioration of a channel environment, the UE may select a resource for retransmission based on the UE-specific resource hopping pattern information received in operation (1) above.

(8) A BS may allocate a UE that uses the same pilot sequence to another resource zone and support MUD to be normally performed.

(9) A BS may variably set a resource for ensuring a plurality of connections depending on the number of UEs.

When the aforementioned proposed method is used, it may be possible to transmit and receive uplink data without initial control signaling when uplink traffic of a UE occurs in a massive sporadic packet. The method will be described below in detail.

Embodiment 1-1: Multiple Access Scheme of Plurality of UEs Sharing the Same Resource FIG. 5 is a diagram illustrating an example of an uplink transmitting method between multiple UEs that share the same resource.

Figure 5:
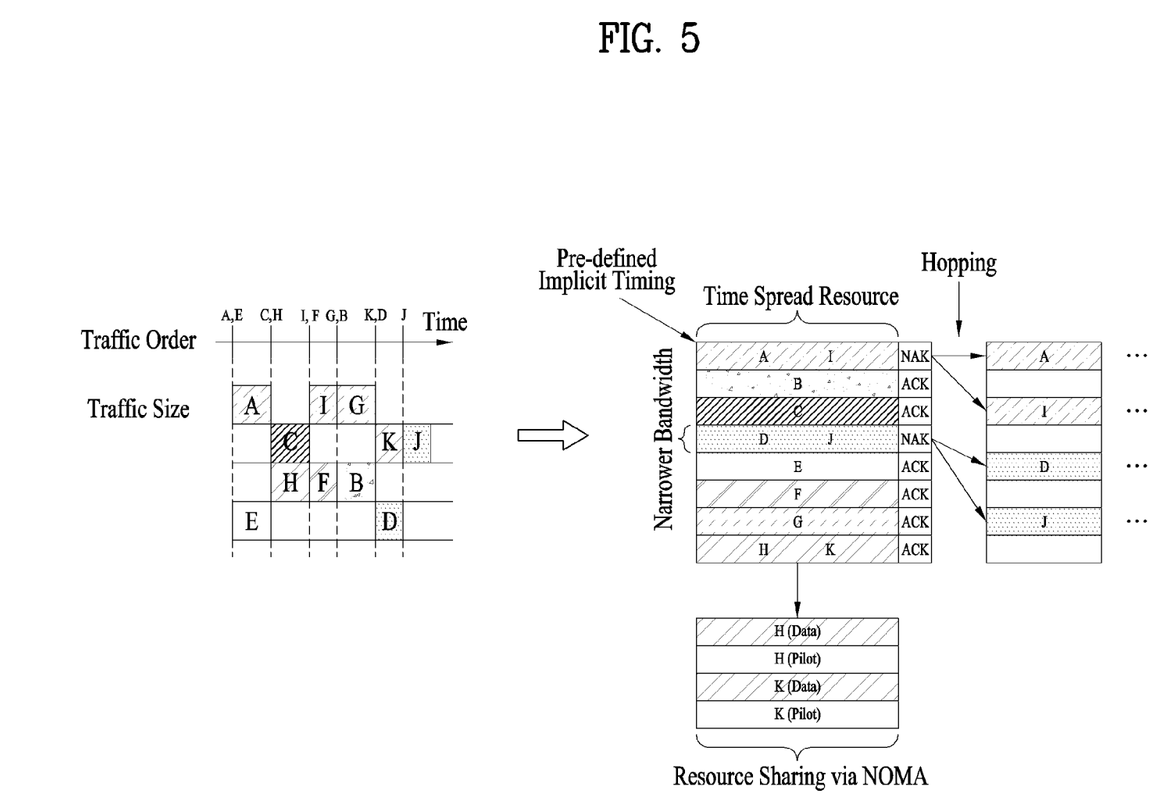
FIG. 5 is a diagram illustrating an example of an uplink transmitting method between multiple UEs that share the same resource.

FIG. 5 illustrates an uplink transmitting method of multiple UEs that share the same resource. It may be assumed that each UE is pre-allocated control information for uplink data transmission through predefined control information from a serving BS. The uplink transmission method of the UE may be performed based on the predefined control information and may be performed based on the following schemes.

1. The predefined control information in operation (1) above is shared: Each UE may be pre-allocated control information for uplink data transmission through the predefined control information from a serving BS. The predefined control information may include implicit timing information in terms of transmission for synchronization with a UE-specific sequence used in simultaneous access of multiple UEs, UE-specific pilot sequence information, MCS level, resource zone allocation information, frequency hopping pattern information for retransmission, control information for MUD, and so on. The predefined control information may be long-term control information that is pre-shared by a transmitting side and a receiving side and may not be related to an uplink information transmitting time point.

For example, UE-specific sequence allocation will be described in detail. Simultaneous access of more UEs than an orthogonal multiple access method of a conventional LTE/LTE-A system in the same resource may be permitted to support a plurality of massive MTC UEs and, in this regard, a method therefor will be described below.

A. Pattern Division Multiple Access (PDMA)

1) Binary Codebook Set: Through a binary spreading sequence, the binary codebook set may be used in superposition transmission of a maximum of $2^N-1 (=_NC_1 +_N C_2 +_N C_3 + \ldots +_N C_N)$ massive MTC (mMTC) UEs with respect to a sequence length N. If N=3, the number of users is $K=2^N-1$ and a sequence set $$S = [s_1, s_2, \ldots, s_K] = \begin{bmatrix} 1 & 1 & 0 & 1 & 1 & 0 & 0 \\ 1 & 1 & 1 & 0 & 0 & 1 & 0 \\ 1 & 0 & 1 & 1 & 0 & 0 & 1 \end{bmatrix}.$$

With regard to the codebook $$\begin{bmatrix} 1 & 1 & 0 & 1 & 1 & 0 & 0 \\ 1 & 1 & 1 & 0 & 0 & 1 & 0 \\ 1 & 0 & 1 & 1 & 0 & 0 & 1 \end{bmatrix},$$

N and K may be determined depending on a system environment and a set of the codebook may be determined by the determined N and K. Accordingly, each user may be allocated a column vector index of the codebook and may use the column vector index as a UE-specific sequence.

B. Sparse Code Multiple Access (SCMA)

Sparse Complex Codebook Set: The sparse complex codebook set may be used in superposition transmission of an mMTC UE enhanced by an overlapping factor F with respect to a sequence length N through a codebook based on sparsity using complex coefficients and zero tone. Each user may own a UE-specific codebook and select and use a column vector in the codebook depending on an information bit.

If N=4 and F=1.5, the number of users K=N*F=6 and a UE-specific codebook $$C = [c_1, c_2, \ldots, c_K], \text{ Here,}$$

$$c_1 = \begin{bmatrix} 0 & 0 & 0 & 0 \\ a & b & -b & -a \\ 0 & 0 & 0 & 0 \\ c & d & -d & -c \end{bmatrix}, c_2 = \begin{bmatrix} c & d & -d & -c \\ 0 & 0 & 0 & 0 \\ a & b & -b & -a \\ 0 & 0 & 0 & 0 \end{bmatrix},$$

$$c_3 = \begin{bmatrix} b^* & -a^* & a^* & -b^* \\ e & f & -f & -e \\ 0 & 0 & 0 & 0 \\ 0 & 0 & 0 & 0 \end{bmatrix}, c_4 = \begin{bmatrix} 0 & 0 & 0 & 0 \\ 0 & 0 & 0 & 0 \\ c & d & -d & -c \\ g & h & -h & -g \end{bmatrix},$$

$$c_5 = \begin{bmatrix} g & h & -h & -g \\ 0 & 0 & 0 & 0 \\ 0 & 0 & 0 & 0 \\ b^* & -a^* & a^* & -b^* \end{bmatrix}, c_6 = \begin{bmatrix} 0 & 0 & 0 & 0 \\ c & d & -d & -c \\ e & f & -f & -e \\ 0 & 0 & 0 & 0 \end{bmatrix}.$$

a, b, c, d, e, f, g, h are complex values.

With regard to the codebook, N and F may be determined depending on a system environment. Accordingly, each user may be allocated a UE-specific codebook index and may use the UE-specific codebook index as a UE-specific sequence for superposition with modulation of an information bit.

C. Interleave Division Multiple Access (IDMA)

User-Specific Interleaver: Interleavers may be randomly and independently designed such that interleaved simultaneous transmission sequences are statically independent. With regard to a sequence length N, superposition transmission of a maximum of N! mMTC UEs may be possible.

Original Sequence: [1, 2, 3, 4, 5, 6, 7, 8], UE-specific sequence interleaver 1: [3, 1, 7, 2, 8, 6, 4, 5], UE-specific interleaver 2: [2, 1, 6, 8, 3, 5, 4, 7], . . . , UE-specific interleaver K: [1, 7, 6, 3, 5, 8, 2, 4].

With regard to the interleaver, N and K may be determined depending on a system environment and a set of interleavers may be determined depending on the determined N and K. Accordingly, each user may be allocated an interleaver index and may use the interleaver index as a UE-specific interleaver pattern.

D. Multi-user Superposition Transmission (MUST)

Power Control: Symbols between mMTC UEs may be superposed and transmitted through a power difference between symbols of multiple user and hierarchical modulation. UE-specific power index=P1 and UE-specific power index 2=P2. The UE-specific power index may be index information of a quantized power level allocated by a BS, a low power symbol may be allocated to a user in a cell, a high power symbol may be allocated to a cell-edge user, and mMTC UEs may each transmit a signal at an allocated power level so as to superpose symbols between mMTC UEs and to transmit a signal.

The pre-defined implicit timing scheme illustrated in FIG. 4 will be described below. UEs that have different uplink transmission requirements and traffic sizes may perform uplink transmission using a multiple access method of enabling MUD in consideration of only predefined implicit timing. The predefined implicit timing method may refer to a scheme for controlling asynchronization via synchronization in a unit of symbols in terms of transmission through predefined periodic timing. In addition, a BS may group UEs with similar propagation delay time and allocate the same grouped resource zone to the same group to control timing offset in terms of reception within CP. The BS may perform UE grouping based on a predefined timing distance and may pre-allocate a resource zone (or a resource region) to each UE group.

Figure 6:
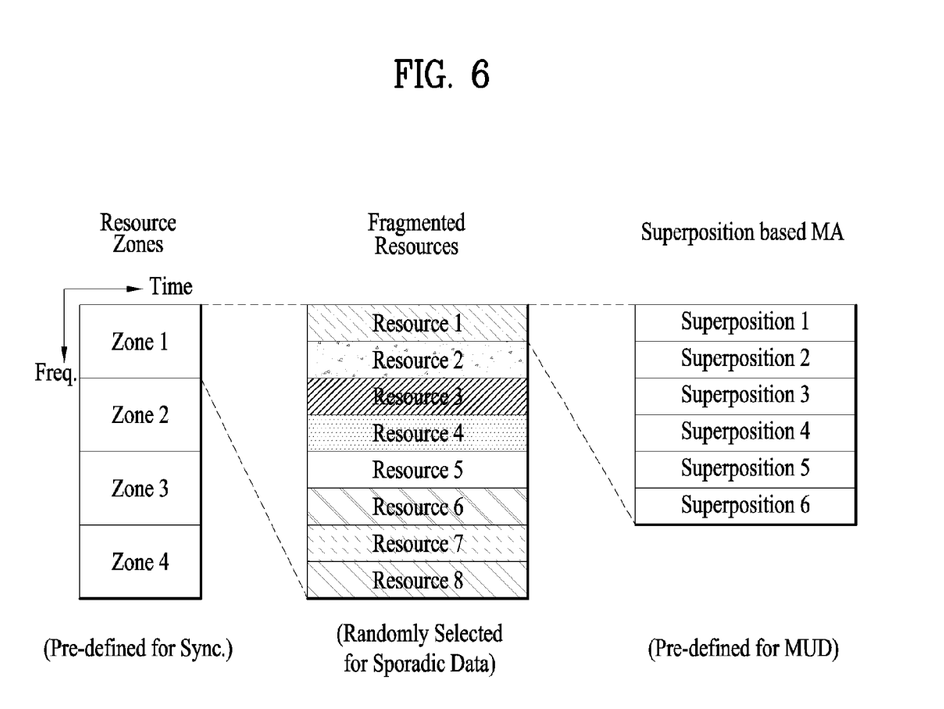
FIG. 6 is an exemplary diagram for explanation of fragmentation of a resource zone and a resource selection scheme.

FIG. 6 is an exemplary diagram for explanation of fragmentation of a resource zone and a resource selection scheme.

In the case of massive MTC, a plurality of UEs transmit sporadic packet data to be insensitive to delay and, thus, one resource zone may be fragmented and used. As the resource zone is fragmented, an uplink data transmission rate of a UE may be reduced, whereas the number of UEs that are capable of being simultaneously supported by a BS may be increased. Each UE may transmit an uplink signal at predefined implicit timing closest to a time point when a request for uplink transmission is made. In this case, irrespective of an order in which a transmission request is made or a traffic size, each UE may perform uplink transmission through a UE-specific resource zone without consideration of timing or resource occupation of another UE. UE-specific resource selection may be pre-defined by a BS through predefined control information. Then, the BS may perform MUD at a symbol level or a codeword level using a used multi-user superposition access technology.

The MUD method may be changed depending on the aforementioned superposed-transmission method and may be used to identify a signal of a multi-user through an SIC or PIC method as an iterative decoding method. Using the aforementioned superposed-transmission method, a user-specific superposition index may be predefined. In this case, each UE may randomly select any one (e.g., resource 1 in FIG. 5) from a fragmented resource zone and may transmit the selected resource. When collision with another UE is not capable of being identified using an MUD method, the BS may transmit an NACK signal to a corresponding UE and the corresponding UE may perform retransmission through a randomly selected fragmented resource zone. A random sequence selection method used in a random access process of an existing MTC system or an LTE system may be used in contention-based access or synchronization of a UE. On the other hand, a combination of the aforementioned random selection method of a fragmented resource and the superposition-based MA method may perform transmission of data in a connectionless state (e.g., in an RRC-connected state). Accordingly, mMTC UEs may perform every instantaneous contention-based uplink data transmission.

Power control scheme: Power control for uplink signal transmission of a UE may be autonomously determined based on CQI information in terms of a long term (Open Loop Power Control).

Channel estimation scheme: Pilot information for uplink channel estimation may be transmitted in a different resource element (RE) from a data transmission RE or may transmit the pilot information to be superposed with uplink data in the same RE. Here, a pilot of a multi-user may be identified using a code division multiplexing method and each UE may be allocated a pilot including a UE-specific sequence from the BS. When uplink data and a pilot are transmitted to be superposed, a signal received by a BS may be represented according to Equation 1 below.

$$y = \Sigma_{k=1}^{K} h_k (x_k + p_k) + n \qquad \text{[Equation 1]}$$

Here, y is a reception signal vector of a length L, n is a noise vector, K is the number of all UEs, and $h_k$ is a channel of $k^{th}$ UE. $x_k$ is an uplink data vector of a UE and $p_k$ is a pilot vector for channel estimation from a UE. $x_k$ and $p_k$ are independently generated and a pilot vector $p_k$ is configured with a UE-specific sequence. A BS as a receiver may differentiate data and a pilot signal using a successive interference cancelation (SIC) or parallel interference cancelation (PIC) method as an iterative decoding method. It is assumed that, depending on the length L of $p_k$, the number of sequences is limited and the BS pre-allocates the sequences to a user at an initial access time point. In this case, when the number of sequences is greater than the number of UEs, the sequences may be redundantly allocated. In this case, uplink data and pilots of a UE are superposed and transmitted and, thus, data transmission power is reduced by a pilot size. There may be various selection ways of a transmission power ratio of uplink data and the pilots due to a correlation between channel estimation accuracy and a data decoding rate. For example, when transmission power of pilots is greater than transmission power of data, the accuracy of channel estimation may be enhanced but a data decoding rate may be reduced. On the other hand, when transmission power of data is greater than transmission power of pilots, the data decoding rate may be enhanced but the accuracy of channel estimation may be reduced. Here, reduction in channel estimation re-affects reduction in data decoding rate and, thus, there is a need to set an appropriate transmission power rate depending on a channel environment of a system.

Multi-user detection (MUD) scheme: When a plurality of users use one time-frequency resource in order to transmit multi-user data, a multi-user access scheme for identifying the multi-user data may be used. For example, a user-specific Interleaver method of IDMA, a codebook method of Index, PDMA, or SCMA, a power control method of a codeword index, power level non-orthogonal multiple access (NOMA), or MUST, a power control level, or the like may be used as a multi-user superposition method of an mMTC user.

A BS may differentiate superposed uplink symbols from mMTC UEs through a maximum likelihood (ML) method or Maximum joint A posteriori Probability (MAP) that has high complexity but has excellent MUD capability. Both the ML and MAP methods may be applied to the aforementioned superposition method. The BS may differentiate superposed UL symbols from mMTC UEs based on a MUD method that has relatively low complexity but has loss in decoding capability based on codeword interference cancellation (CWIC), iterative massage passing algorithm (MPA), and SIC. The CWIC method or the SIC method may be applied to MUST and the MPA method may be applied to SCMA or PDMA. The BS may differentiate superposed uplink symbols from mMTC UEs using an MUD method that has relatively low complexity and minimizes decoding capability based on PIC. The PIC method may be applied to IDMA.

Resource hopping scheme: Selection of an initial resource and selection of a resource to be used in retransmission may be performed through a UE-specific hopping pattern. For example, when there are eight resource candidates, UE A (which is denoted by A in FIG. 4) may perform resource hopping using a hopping pattern of 1-1-$a_A$-$b_A$-$c_A$- . . . , UE I may perform resource hopping using a hopping pattern of 1-3-$a_I$,$b_I$,$c_I$- . . . , and UE D may perform resource hopping using a hopping pattern of 4-5-$a_D$-$b_D$-$c_D$- . . . in FIG. 4. Here, $a_A$, $b_A$, $c_A$, etc. may be any hopping pattern value.

Collision avoidance method of the same sequence user: Each UE performs uplink transmission without consideration of resource occupation of another UE and, thus, collision between singles of a plurality of UEs in the same resource may occur. Even if a multiple access technology for enabling MUD is used to identify data of a multi-user, it may not be possible to identify the data when UEs using the same pilot sequence use the same resource. Accordingly, a BS needs to allocate UEs using the same pilot sequence to different resource zones to normally perform MUD.

Variable resource setting scheme: In a multiple access method according to the present invention, multiple UEs share the same resource zone and perform uplink transmission and, thus, may variably use a resource. In order to achieve a large number of connection in terms of air interface, a narrower subcarrier, a narrower bandwidth, a narrower resource block (RB), or a narrower sub-band may be configured. For example, symbol duration may be changed through configuration of various subcarriers such as 10 KHz and 5 KHz by dividing sub-carrier spacing of 15 KHz of an LTE system and, even if sub-carrier spacing is changed, the multiple access method proposed by the present invention may be used. Similarly, even if various RB unit configurations such as 10 and 14 are set in 12 sub carriers, the aforementioned multiple access method may be used. A sub-band may also be variably configured using a similar method.

Figure 7:
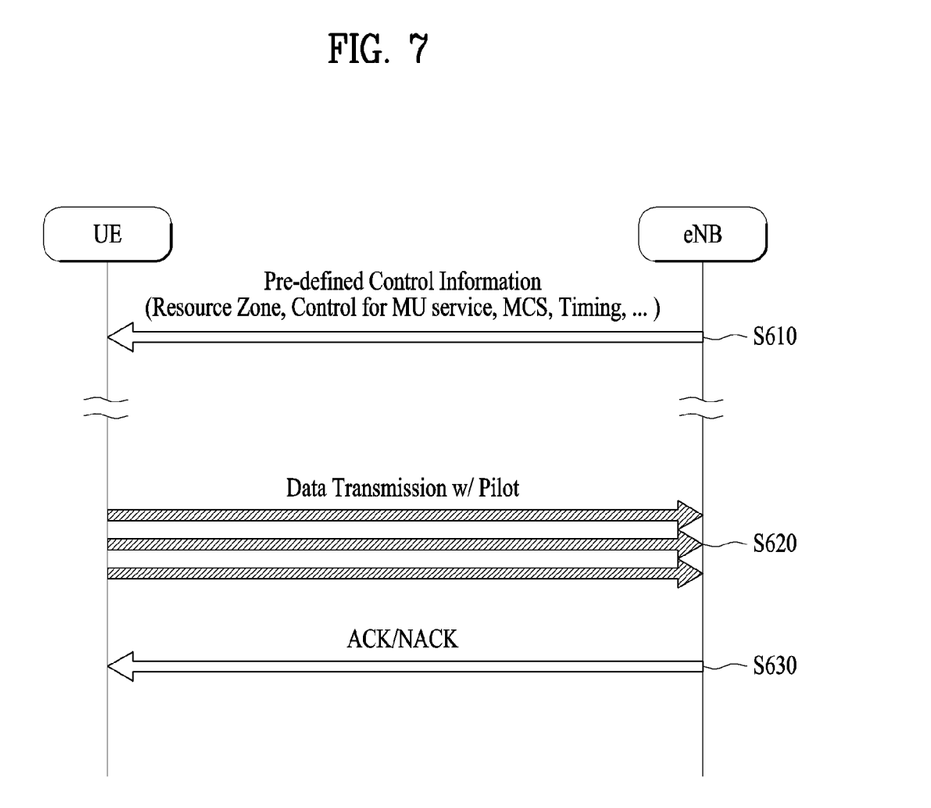
FIG. 7 is a diagram of an example of flow of enhanced multiple access based signal for massive sporadic packet transmission.

Embodiment 2: Flow of Enhanced Multiple Access Based Signal for Massive Sporadic Packet Transmission with Respect to Embodiment 1 Above FIG. 7 is a diagram of an example of flow of enhanced multiple access based signal for massive sporadic packet transmission.

The present invention proposes signal flow in terms of a transceiving end for performing the multi-user access method proposed in Embodiment 1 above. Each UE may pre-receive predefined control information from a corresponding BS to acquire information used in uplink (S610). The predefined control information may include resource hopping pattern information (in particular, the resource hopping pattern information may be used to select a resource for retransmission) for supporting massive sporadic packet transmission, UE-specific pilot sequence information, pilot pattern information, resource zone allocation information, control information for multi-user detection (MUD), implicit timing information, MCS level information, frequency hopping sequence information, and so on.

When uplink traffic occurs, each UE may perform uplink data transmission irrespective of uplink transmission of another user while not receiving any control signal from a BS after the uplink traffic occurs (S620). Upon failing in data detection, the BS may transmit NACK to the corresponding to the UE in order to perform retransmission (S630).

When the method proposed according to the present invention is used, uplink data transmission and reception may be possible without initial control signaling when uplink of the UE occurs in massive sporadic packet transmission.

S620 of FIG. 7 shows an example of a structure of simplifying control procedure/overhead of a conventional multiple access method and transmitting only data and pilot. The BS may notify the UE of the predefined control information described in Embodiment 1 above periodically or during downlink information transmission. As described above, the predefined control information may not be related to a time point when uplink traffic occurs of a UE and a time point when the predefined control information is transmitted and the time point when uplink traffic occurs may be different. When uplink traffic occurs, the UE may perform uplink data transmission based on pre-received predefined control information. The UE may be controlled by the BS during uplink data transmission or may perform uplink transmission irrespective of resource occupation of another user. In this case, the UE may transmit pilot information for channel estimation to different resource element (RE) from a data transmission RE or may superpose and transmit uplink data in the same RE. Here, a pilot of a multiple UE may be identified using a code division multiplexing method and each UE may be pre-allocated a pilot configured with a UE-specific sequence from the BS.

The BS may decode pilots and data through an MUD process and transmit a NACK signal to a NACK signal to the UE upon failing in detection (S630). The UE that receives the NACK signal may perform retransmission. On the other hand, upon decoding pilot and data and succeeding in detection, the BS may transmit ACK to the UE (S630) and the UE may completely perform uplink transmission.

Figure 8:
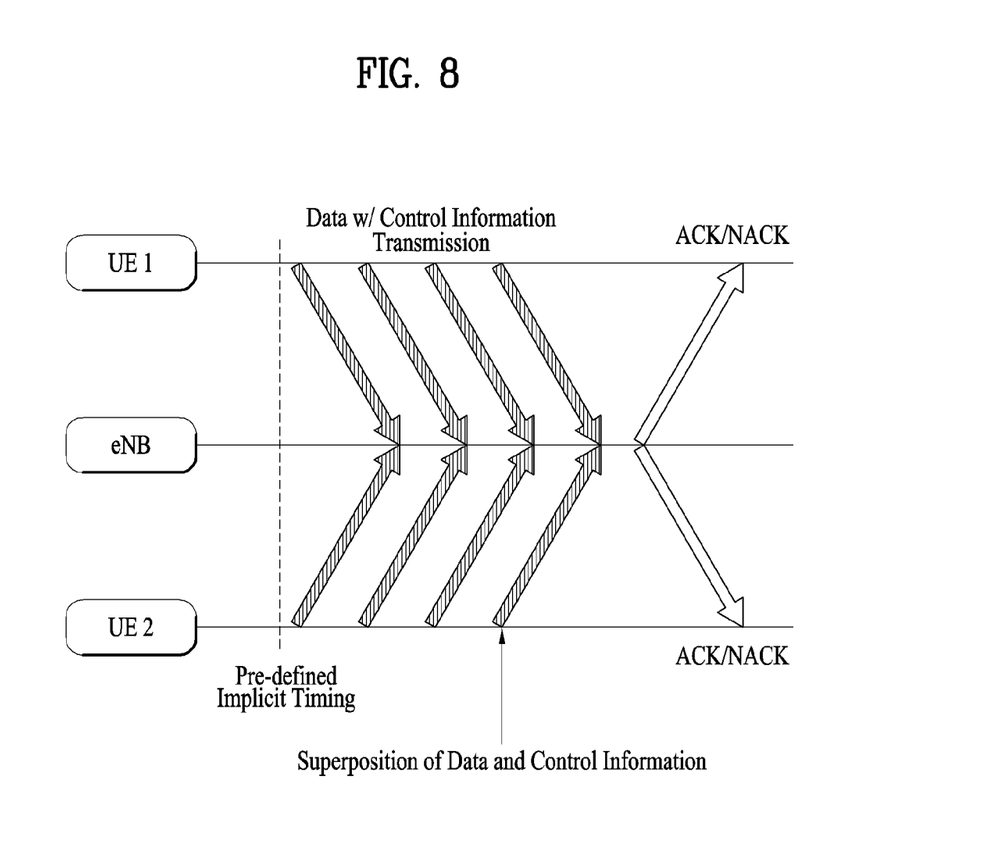
FIG. 8 is a diagram of an example of flow of a signal for massive sporadic packet transmission in terms of a multi-user.

FIG. 8 is a diagram of an example of flow of a signal for massive sporadic packet transmission in terms of a multi-user.

Each UE (e.g., UE1 and UE2 of FIG. 7) performs uplink transmission while not receiving any control signal from a BS after a request for data transmission is made and, thus, uplink transmission may be performed at predefined implicit timing as shown in FIG. 7. The predefined implicit timing may be defined in a unit of symbols, slots, or subframes and the period may be changed depending on symbol duration of a corresponding system. In this case, the predefined implicit timing may be periodically present and the period may be variably defined as a symbol, a subframe, a frame, and so on.

The UE may transmit uplink data at predefined implicit timing closest to a time point when uplink traffic occurs. Through the scheme according to the present invention, a multi-user may allow multi-access while ensuring connection of a plurality of users without overhead with respect to initial control signaling.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of supporting a massive sporadic packet service and an apparatus therefor may be industrially applied in various wireless communication systems such as 3GPP LTE-A, a 5G communication system, and so on.

The invention claimed is:

1. A method of transmitting massive sporadic packets of uplink data by a user equipment (UE), the method comprising:
    receiving, from a base station (BS), control information including predefined timing information related to synchronization of transmission timings for the massive sporadic packets and resource allocation information related to a resource zone for the UE;
    synchronizing, by the UE, the transmission timings for the massive sporadic packets based on the predefined timing information when uplink traffic occurs,
    wherein additional control signals related to uplink data transmission of the massive sporadic packets are not received from the BS to the UE;
    selecting a resource among a plurality of resources included in the resource zone, by the UE, for the uplink data transmission based on the resource allocation information; and
    transmitting, to the BS, the massive sporadic packets through the selected resource,
    wherein the resource zone is allocated commonly to a group of UEs having similar propagation delay time, and timing offset of the BS related to the group is configured to have a value less than a length of Cyclic Prefix (CP);
    wherein the UE is included in the group.

2. The method according to claim 1, wherein the control information further includes information related to a pilot sequence specified for the UE; and
    wherein a pilot signal of the pilot sequence transmitted in the selected resource to be superposed with the massive sporadic packets.

3. The method according to claim 1, wherein the control information further includes hopping pattern information, the method further comprising:
    receiving, from the BS, a NACK signal with respect to the uplink data transmission; and
    selecting a resource for uplink data retransmission in response to the NACK signal, by performing resource hopping based on the hopping pattern information.

4. The method according to claim 1, wherein the massive sporadic packets are transmitted in a connectionless state with the BS.

5. The method according to claim 1, wherein the predefined timing information includes periodic timings.

6. The method according to claim 1, wherein the massive sporadic packets are transmitted at timings closest to periodic timings, included in the predefined timing information, after the uplink traffic occurs.

7. A user equipment (UE) for transmitting massive sporadic packets of uplink data, the UE comprising:
    a receiver configured to receive, from a base station (BS), control information including predefined timing information related to synchronization of transmission timings for the massive sporadic packets and resource allocation information related to a resource zone for the UE;
    a processor configured to:
        synchronize the transmission timings for the massive sporadic packets based on the predefined timing information when uplink traffic occurs,
        wherein additional control signals related to uplink data transmission of the massive sporadic packets are not received from the BS to the UE, and
        select a resource among a plurality of resources included in the resource zone, for the uplink data transmission based on the resource allocation information, and
    a transmitter configured to transmit, to the BS, the massive sporadic packets through the selected resource,
    wherein the resource zone is allocated commonly to a group of UEs having similar propagation delay time, and timing offset of the BS related to the group is configured to have a value less than a length of Cyclic Prefix (CP);
    wherein the UE is included in the group.

8. The UE according to claim 7, wherein the control information further includes information related to a pilot sequence specified for the UE; and
    the processor controls the transmitter to transmit a pilot signal of the pilot sequence in the selected resource to be superposed with the massive sporadic packets.

9. The UE according to claim 7, wherein the control information further includes hopping pattern information;
    wherein the receiver is configured to receive, from the BS, a NACK signal with respect to the uplink data transmission; and
    wherein the processor is configured to select a resource for uplink data retransmission in response to the NACK signal, by performing resource hopping based on the hopping pattern information.

10. The UE according to claim 7, wherein the massive sporadic packets are transmitted in a connectionless state with the BS.

11. The UE according to claim 7, wherein the predefined timing information includes periodic timings.

12. The UE according to claim 7, wherein the massive sporadic packets are transmitted at timings closest to periodic timings, included in the predefined timing information, after the uplink traffic occurs.

* * * * *